March 14, 1939.   J. W. JOHNSON   2,150,375
EGG CANDLING MACHINE
Filed April 14, 1936   3 Sheets-Sheet 1

INVENTOR
JAMES W. JOHNSON
BY James M. Abbett
ATTORNEY

March 14, 1939. J. W. JOHNSON 2,150,375
EGG CANDLING MACHINE
Filed April 14, 1936 3 Sheets-Sheet 2
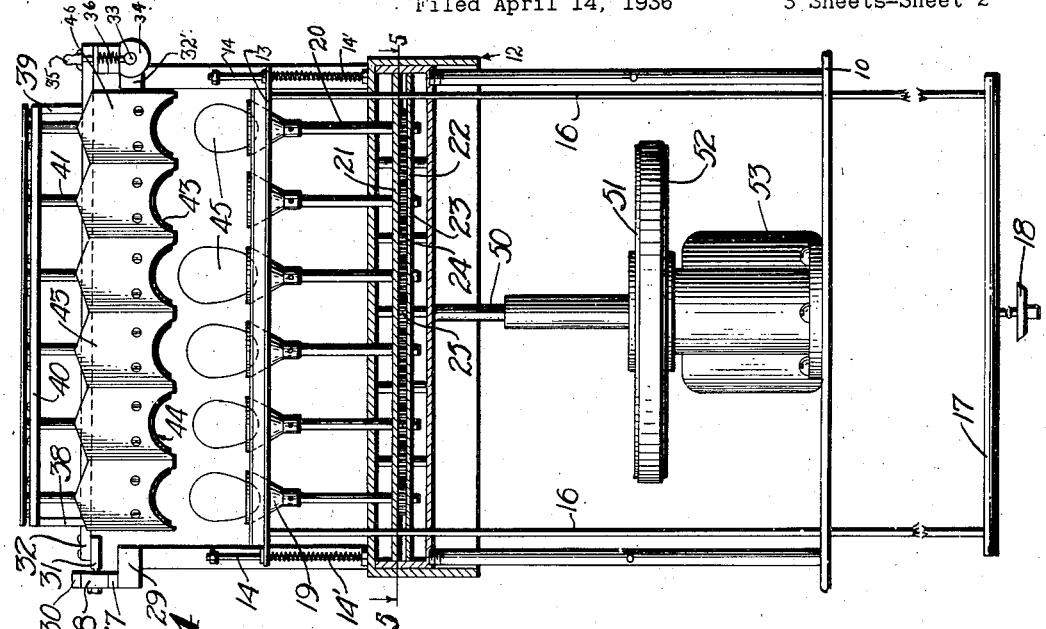
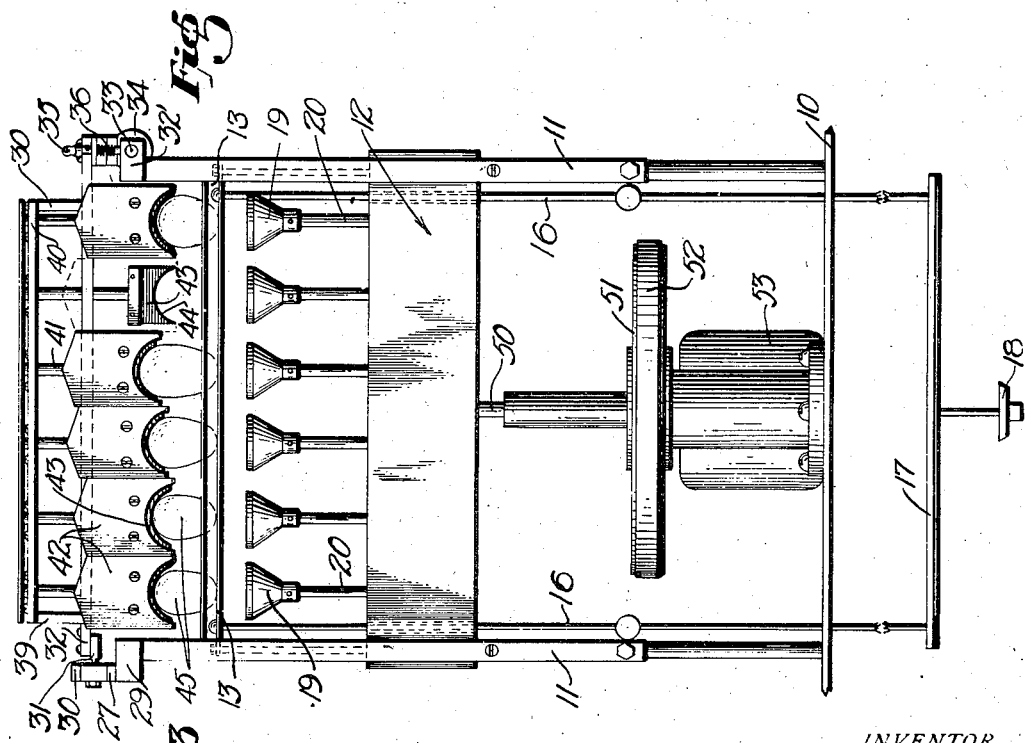
INVENTOR
JAMES W. JOHNSON
BY
James M. Abbett
ATTORNEY March 14, 1939.  J. W. JOHNSON  2,150,375
EGG CANDLING MACHINE
Filed April 14, 1936  3 Sheets-Sheet 3
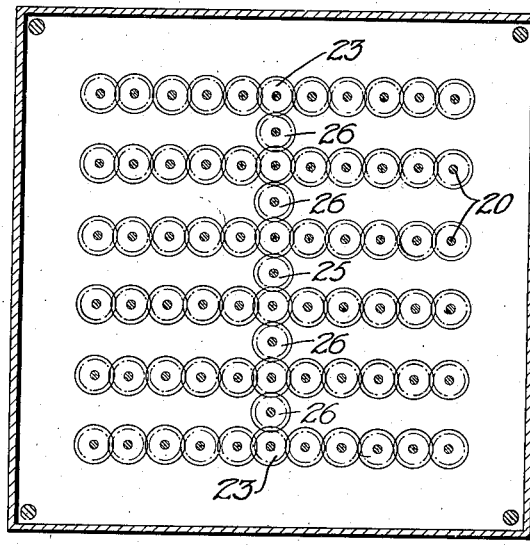
Fig. 5
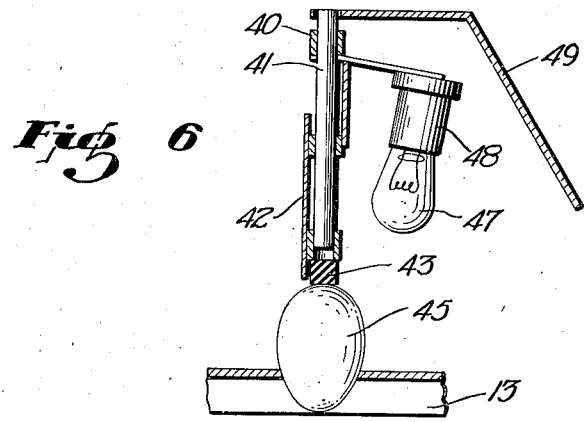
Fig. 6
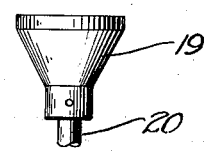
INVENTOR
JAMES W. JOHNSON
BY
*James M. Abbott*
ATTORNEY Patented Mar. 14, 1939

2,150,375

UNITED STATES PATENT OFFICE 2,150,375

EGG CANDLING MACHINE

James W. Johnson, Los Angeles, Calif.

Application April 14, 1936, Serial No. 74,303

13 Claims. (Cl. 88—14.8)

This invention relates to a machine within which eggs are inspected, and particularly pertains to an egg candling machine.

When eggs are packed they are first inspected to determine their freshness. This is done by placing the egg over a light and examining the relative opaqueness of the yolk and the white of the egg. This is determined in comparison with a definite chart standard by which eggs are graded. It has been found that the candling operation may be carried on accurately if the egg is rotated on its major axis. It is also desirable to inspect eggs rapidly and it is the principal object of the present invention therefore to provide an egg candling machine into which eggs may be rapidly placed by various means, such for example as the egg handling trays shown in my Patent No. 2,011,972 entitled Egg handling device, and issued to me on the 20th day of August, 1935, said machine acting to separately hold the eggs and to spin them while a plurality of eggs thus held and spinning are moved into position relative to a source of light by which the eggs are inspected and candled.

The present invention contemplates the provision of a plurality of individual sockets into which eggs may be seated with their major axes vertical, said sockets being separately driven and being mounted in a manner to make it possible for successive rows of the eggs to be moved into position to be illuminated and inspected, and thereafter rapidly moved and taken from the machine.

The invention is illustrated by way of example in the accompanying drawings in which:

Fig. 3 is a view in front elevation showing a partial row of eggs temporarily supported prior to being engaged by the egg spinning members.

Fig. 4 is a view in section and elevation showing the eggs within the spinning cups, and further indicating the drive means for these cups.

Fig. 5 is a view in horizontal section through the gear box for the spinning cup drive means as seen on the line 5—5 of Fig. 4.

Fig. 6 is an enlarged detail view partly in section showing a spinning cup in position to receive an egg and also disclosing the illuminating means in operative position relative to the egg.

Figure 1:
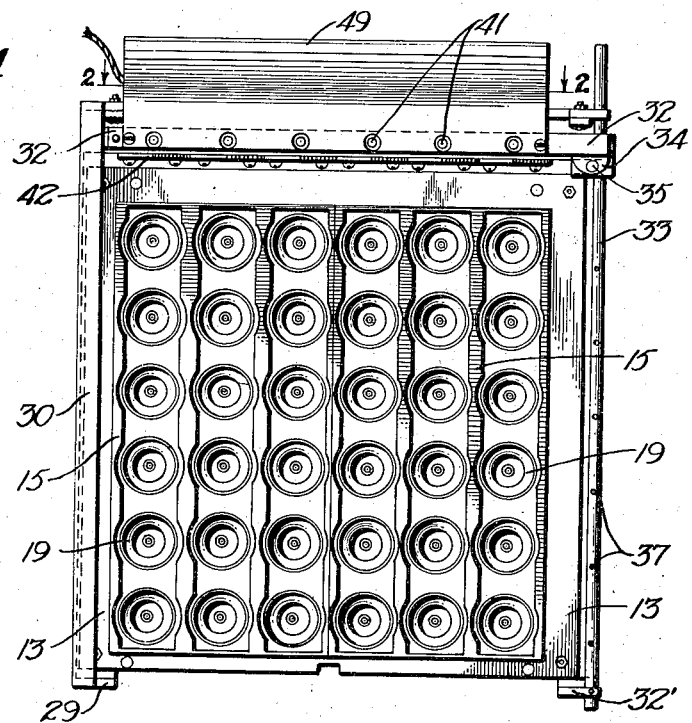
Figure 1 is a view in plan showing the machine with which the present invention is concerned, and particularly indicating the illuminating means at one end of its path of travel.
Figure 2:
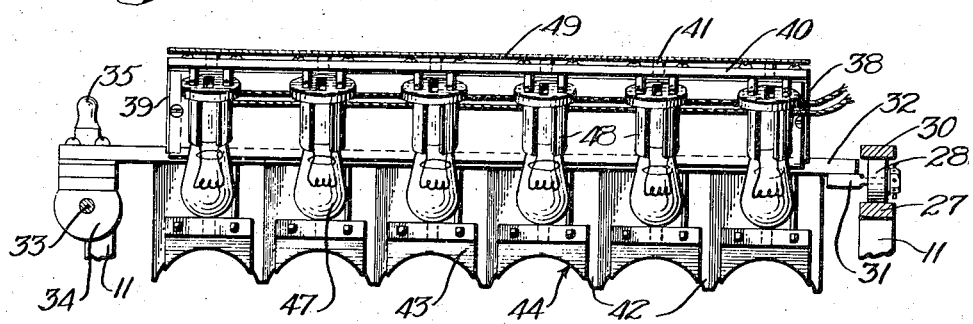
Fig. 2 is a view in transverse vertical section through the illuminating means as seen on the line 2—2 of Fig. 1.

Referring more particularly to the drawings, 10 indicates a base plate carrying vertical standards 11, which support a fixed platform which houses a gear box 12 at a point in their height. Mounted above the gear box is an egg platform 13 which is disposed in a horizontal plane and may move vertically upon a plurality of guide rods 14. These guide rods carry springs 14' interposed between the upper face of the gear box and the overhanging edges of the platform structure 13. As shown in Fig. 1 of the drawings the platform 13 is formed with a plurality of parallel rails 15 which at points in their length have arcuate recesses in them so that temporary supporting seats for the eggs will be provided for a purpose to be hereinafter set forth. Connected with the platform 13 is a set of pull rods 16 which extend downwardly to a cross bar 17 to which a foot treadle 18 is attached. When the treadle is depressed the rods 16 draw the platform 13 downwardly carrying the eggs which are supported thereon, and depositing them in individual spinning cups 19. These cups have conical seats within them on which the small end of an egg may rest. Each of the cups is formed with a vertical shaft 20 extending downwardly through the gear box 12 and through bearing plates 21 and 22. Each of the shafts 20 is fitted with a pinion 23, the pinion 23 being in mesh with intermediate idler pinions 24 by which rotation of all of the pinions in a row will be maintained in one direction. A center drive pinion 25 is mounted upon a shaft 50 which carries a pulley wheel 51. The wheel is provided with a belt 52 leading to a pulley upon a motor 53. It will be understood that other types of driving means may be used if desired. The pinion 25 imparts driving motion to gears 23 of rows of gears on each side of the pinion 25 and the pinions 26 impart driving motion from one row of gears to an adjacent row. Mounted above the platform and the spinning cups is a trackway carried by the upper extending ends of the uprights 11. As shown in Figs. 3 and 4, this structure comprises a track 27 along which a roller 28 may move. The track is supported by a bracket 29 carried by the uprights of the frame. A guard rail 30 extends above the roller 28. The roller is mounted upon a shaft 31 which is fastened to a cross plate 32 of an illuminating unit. Carried on a bracket 32' at the opposite side of the frame is a horizontal guide rod 33 which receives a sliding bearing 34. This bearing also carries a lock pin 35 which extends vertically and is yieldably held by a spring 36. The pin is adapted to engage openings 37 in the guide rod 33 which temporarily hold the frame of the illuminating device in proper alignment with the transverse row of spinning cups and a row of eggs resting thereover in the seats of the platform 13. The cross frame member 32 is formed with uprights 38 and 39 which carry a transverse bearing bar 40 through which vertical guide shafts 41 extend. These guide shafts also extend through openings in the cross bar 32 and may freely slide vertically through the openings in the cross bar 32 and the openings in the guide bar 40. The lower ends of each of the shafts 41 carry a fastening plate 42 in which an egg templet 43 is secured. This templet is preferably made of a flat strip of rubber attached to the plate 42 and extending vertically. The lower edge of the templet is formed with an arcuate portion 44 which substantially agrees with the transverse contour of the upper end of eggs 45. Light shield plates 46 are also carried by each of the members 41 and 42. These shields substantially meet along adjoining vertical edges and shield light from the electric light globes 47 which are disposed in the rear of the shields and are carried by the frame. The arrangement of these members is particularly shown in Fig. 2 of the drawings where it will be seen that a light globe 47 and its socket 48 are mounted, one in the rear of each of the light shields. These are carried by the bar 40 which is attached to a housing 49 extending downwardly and rearwardly therefrom to enclose the bank of light sockets and globes disposed in the rear thereof, as shown in Figs. 2 and 6.

In operation of the present invention the eggs are placed in the seats provided by the rails 15 and are thus arranged in spaced relation to each other, and in rows extending transversely and longitudinally of the machine. At this time the illuminating structure stands at the rear of the machine as shown in Fig. 1. The foot treadle is then depressed to draw the platform 13 downwardly until the eggs are resting within the seating ends of the spinning cups 19 and are lifted above their previous position upon the rails 15 of the platform 13. The motor 53 is set in motion, either before or after the platform 13 is lowered. When the platform has been lowered and the eggs are individually resting in the spinning cups 19 the eggs will be spun on their major axis which is extending vertically, with the result that a gyratory motion will be set up within the egg so that the yolk and white of the egg may be more clearly discernible and its condition more accurately defined. The illuminating unit is then moved forwardly to the first row of eggs where the pin 35 will register with the recess 37 and properly align the templet 43 with a vertical plane intersecting the center of the eggs in the row. The foot treadle 18 is then released and the platform 13 as urged by springs 14' will be raised. In the raising operation the eggs will again assume their seated position upon the platform, and will be lifted until their uppermost ends engage the arcuate faces 44 of the templets 43. In the event that the eggs are of different size the templets will be free to lift and accommodate them so that the silhouette of each egg and its contents will be clearly defined by the illuminating action of the light globes 47 which are disposed in the rear of each of the shields and templets. In this manner the eggs may be rapidly candled and graded, and due to the fact that each of the templets and shields is free to lift, the rejected eggs may be instantly removed from the machine.

It will thus be seen that the machine here disclosed makes it possible for a large number of eggs to be handled at one time, and candled, and that due to the operation upon the egg it is possible to accurately select and grade the eggs and to rapidly pack them in grading cases.

While I have shown the preferred form of my invention, as now known to me, it will be understood that various changes might be made in the combination, construction, and arrangement of parts, by those skilled in the art, without departing from the spirit of the invention as claimed.

Having thus described my invention, what I claim and desire to secure by Letters Patent is:

1. An egg candling machine comprising a plurality of egg spinning cups arranged in longitudinally and laterally extending rows, a skeleton platform mounted for vertical movement and normally disposed above the set of spinning cups and adapted to support eggs with their major axes vertical and in alignment over the cups whereby individual eggs may rest in individual cups when the platform is lowered, common means for driving all of the spinning cups with the eggs lowered therein, means for lowering and raising the platform to cause the platform to lift the individual eggs from the spinning cups and hold them so that their contents will continue to gyrate around their vertical axes, track means above the platform, an egg illuminating unit adapted to slide along the track and above the eggs supported on the platform, means for setting the illuminating unit in alignment with a laterally extending row of eggs supported on the platform, templets carried by the illuminating unit, said templets being individually movable and adapted to substantially conform to the upper end contour of the eggs, and lights carried by the illuminating means whereby each egg may be individually illuminated from the rear of its templet whereby the contents of the egg may be observed.

2. An egg candling machine comprising a skeleton frame structure, a platform carried by said frame structure and having a plurality of openings in which eggs are set, a plurality of rotatably mounted cups aligned with said openings and adapted for passage therethrough, means for individually driving said cups whereby the eggs deposited thereon may be spun on their vertical axis, an illuminating unit adapted to be moved relative to the platform, means for supporting the unit for movement relative to the platform, and means for raising and lowering the platform to position the eggs on the spinning cups and to lift them into the candling position relative to the illuminating means.

3. An egg candling machine comprising a plurality of egg spinning cups arranged in longitudinally and laterally extending rows, a platform mounted for vertical movement and normally disposed above the set of spinning cups, said platform having openings therein adapted to support eggs with their longitudinal axis in a vertical plane and in alignment with said cups, said cups being adapted for passage through said openings, means for spinning said cups whereby said eggs will be rotated, track means above said platform, an egg illuminating unit mounted for sliding movement on the track and above the eggs supported on said spinning cups, means for lowering the platform, and means for raising said platform whereby the eggs will be moved into candling position relative to said illuminating unit.

4. An egg candling machine comprising a frame structure carrying a platform having a plurality of openings in which a plurality of eggs are adapted to be set, a plurality of rotatably mounted cups disposed beneath said platform, said cups being movable through said openings, means for individually driving said cups whereby the eggs deposited thereon may be spun on their vertical axis, track means above said platform, an illuminating unit adapted for sliding movement on the track, means for supporting the unit for movement relative to the platform, means for raising and lowering the platform to position the eggs on the spinning cups and to lift them into the candling position relative to the illuminating unit and means whereby the shell of said egg will be held in a fixed position while the gyratory motion within the egg will continue.

5. In an egg candling machine, the combination of a supporting structure, a primary platform mounted for vertical movement on said structure and having a series of rows of openings adapted to support eggs therein, a secondary platform secured in fixed relation to said structure, a plurality of cup elements pivotally mounted on the secondary platform, means for lowering the primary platform whereby the cup elements will pass through the openings and support the eggs in a position above the platform, means for rotating the cups, an illuminating unit slidably mounted on the structure above the primary platform, and means for elevating the primary platform so as to dispose the eggs in proximity to the illuminating unit.

6. An egg candling machine, the combination of a frame structure, a primary platform adapted for vertical movement on said structure, said platform having a plurality of openings for initially supporting eggs in position thereon, a secondary platform secured to said structure, a plurality of cup elements pivotally mounted on said secondary platform and extending through said openings, means for lowering said primary platform so as to cause the eggs to be supported by said cup elements, means for rotating the cup elements, an illuminating unit slidably mounted on the upper end of said structure, and means for elevating the primary platform so as to transfer the eggs from the cup elements to the platform openings and in proximity to the illuminating unit.

7. An egg candling machine, the combination of a supporting frame, a primary platform mounted for vertical adjustment on said frame, said platform having a series of rows of openings provided therein for initially holding the eggs in position thereon, a secondary platform mounted in fixed relation to the frame, a plurality of cup elements pivotally mounted on said secondary frame, means for transferring the eggs from their position in the openings to a position of support on the cup elements, means for rotating the cup elements, an illuminating unit slidably mounted on the frame above the primary platform, means for transferring the eggs from the cup elements to the openings, and means for elevating the primary platform so as to dispose the eggs in proximity to the illuminating unit.

8. A combination as set forth in claim 7, in which the illuminating unit comprises a plurality of templets adapted for independent adjustment so as to illuminate eggs of different sizes.

9. A combination as set forth in claim 7, in which the illuminating unit comprises a plurality of templets adapted for independent adjustment whereby defective eggs may be independently removed from the primary platform.

10. A combination as set forth in claim 7, in which the illuminating unit is adjustable to candling positions over the successive rows of eggs on the primary platform.

11. A candling machine comprising a supporting structure, a fixed platform on said structure, a platform adjustably mounted on said structure with relation to said fixed platform, walls providing a plurality of rows of openings in the adjustable platform for supporting the eggs in vertical axial plane, a plurality of cup elements having cross-sectional areas of smaller dimension than the openings, a plurality of intermeshing gears arranged on said fixed platform, shafts connecting between the cup elements and the gears, means for lowering the adjustable platform so as to transfer the eggs from the openings to the cup elements, a mechanism for actuating the gears and shafts so as to rotate the cup elements and eggs disposed therein, an illuminating unit mounted on the frame structure to move across the adjustable platform, means for raising the adjustable platform so as to transfer the eggs from the cup elements to the openings in said platform, and means for adjusting the illuminating unit to candling positions relative to the eggs in the rows of openings.

12. A combination as set forth in claim 11, in which the means for raising and lowering the adjustable platform is manually operated.

13. A combination as set forth in claim 11 in which the illuminating unit is provided with means for locking it in different candling positions.

JAMES W. JOHNSON.